(12) United States Patent
Chaturvedi et al.

(10) Patent No.: US 7,787,440 B1
(45) Date of Patent: Aug. 31, 2010

(54) METHOD FOR CALL SETUP USING SHORT DATA BURSTS

(75) Inventors: Pawan Chaturvedi, Overland Park, KS (US); Tong Zhou, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1375 days.

(21) Appl. No.: 10/277,465

(22) Filed: Oct. 22, 2002

(51) Int. Cl.
*H04L 12/66* (2006.01)

(52) U.S. Cl. .................. 370/352; 370/335; 370/342; 370/441

(58) Field of Classification Search .................. None
See application file for complete search history.

(56) References Cited

U.S. PATENT DOCUMENTS

| | | | |
|---|---|---|---|
| 4,870,408 A | 9/1989 | Zdunek et al. | |
| 5,442,809 A | 8/1995 | Diaz et al. | |
| 5,568,511 A | 10/1996 | Lampe | |
| 5,710,591 A | 1/1998 | Bruno et al. | |
| 5,818,836 A | 10/1998 | DuVal | |
| 5,850,611 A | 12/1998 | Krebs | |
| 5,884,196 A | 3/1999 | Lekven et al. | 455/574 |
| 5,936,964 A | 8/1999 | Valko et al. | |
| 5,983,099 A | 11/1999 | Yao et al. | 455/426 |
| 6,014,556 A | 1/2000 | Bhatia et al. | 455/404 |
| 6,032,051 A | 2/2000 | Hall et al. | |
| 6,119,017 A | 9/2000 | Cassidy et al. | |
| 6,178,323 B1 | 1/2001 | Nagata | |
| 6,381,467 B1 | 4/2002 | Hill et al. | |
| 6,490,452 B1 | 12/2002 | Boscovic et al. | |
| 6,526,377 B1 | 2/2003 | Bubb | |
| 6,681,252 B1 * | 1/2004 | Schuster et al. | 709/227 |
| 6,738,617 B2 | 5/2004 | Rosen et al. | |
| 6,839,337 B2 * | 1/2005 | Newberg et al. | 370/338 |
| 6,865,398 B2 * | 3/2005 | Mengel et al. | 455/552.1 |
| 6,870,830 B1 * | 3/2005 | Schuster et al. | 370/352 |
| 6,914,897 B1 * | 7/2005 | Schuster et al. | 370/352 |
| 6,937,699 B1 * | 8/2005 | Schuster et al. | 379/67.1 |
| 7,035,657 B2 * | 4/2006 | Chen et al. | 455/518 |
| 7,047,031 B2 * | 5/2006 | Rosen et al. | 455/518 |
| 7,130,282 B2 * | 10/2006 | Black | 370/296 |
| 7,200,139 B1 * | 4/2007 | Chu et al. | 370/352 |
| 2002/0055364 A1 | 5/2002 | Wang et al. | 455/466 |
| 2002/0071445 A1 | 6/2002 | Wu et al. | 370/441 |

(Continued)

FOREIGN PATENT DOCUMENTS

EP     0 817 457     1/1998

(Continued)

OTHER PUBLICATIONS

International Search Report from International Application No. PCT/US2003/02950, dated Jan. 30, 2003.

(Continued)

*Primary Examiner*—Michael J Moore, Jr.

(57) ABSTRACT

A first wireless device may connect to a wireless telecommunications network, and it may communicate with the wireless telecommunications network over an air interface signaling channel. The first wireless device may exchange messages with a second device, such as a wired device or a wireless device, in order to establish a session with the second device. The first wireless device may send or receive the messages over an air interface with its wireless telecommunications network using short data bursts.

22 Claims, 6 Drawing Sheets

U.S. PATENT DOCUMENTS

| | | | |
|---|---|---|---|
| 2002/0145990 A1 | 10/2002 | Sayeedi | 370/335 |
| 2002/0147818 A1 | 10/2002 | Wengrovitz | |
| 2002/0172165 A1 | 11/2002 | Rosen et al. | |
| 2002/0172169 A1 | 11/2002 | Rosen et al. | 370/335 |
| 2002/0173325 A1 | 11/2002 | Rosen et al. | 455/518 |
| 2002/0173326 A1 | 11/2002 | Rosen et al. | 455/518 |
| 2002/0173327 A1 | 11/2002 | Rosen et al. | |
| 2002/0177461 A1 | 11/2002 | Rosen et al. | 455/518 |
| 2002/0191583 A1 | 12/2002 | Harris et al. | |
| 2003/0008657 A1 | 1/2003 | Rosen et al. | 455/452 |
| 2003/0021264 A1 | 1/2003 | Zhakov et al. | |
| 2003/0114156 A1 | 6/2003 | Kinnavy | |

FOREIGN PATENT DOCUMENTS

| | | |
|---|---|---|
| EP | 0 984 608 | 3/2000 |

OTHER PUBLICATIONS

Office Action from U.S. Appl. No. 10/067,080, dated May 21, 2003.
Office Action from U.S. Appl. No. 10/067,080, dated Apr. 27, 2004.
International Search Report from International Application No. PCT/US02/31411, dated Mar. 4, 2003.
International Search Report from International Application No. PCT/US02/29575, dated Dec. 10, 2002.
International Search Report from International Application No. PCT/US02/36055, dated Apr. 10, 2003.
International Search Report from International Application No. PCT/US03/03021, dated Jun. 18, 2003.
3$^{rd}$ Generation Partnership Project 2 "3GPP2", Fast Call Set-Up, Version 1.0, Apr. 15, 2002.
Mobile Tornado, http://www.mobiletornado.com/products_iprsptt.html, printed from the World Wide Web on Jan. 27, 2003.
"Qualcomm Chats Up 'Push-to-Talk'," http://siliconvalley.internet.com/news/print.php/953261, printed from the World Wide Web on Jan. 27, 2003.
Schulzrinne and Rosenberg, "SIP Caller Preferences and Callee Capabilities," Internet Engineering Task Force, Internet Draft, Oct. 22, 1999.
Vakil et al., "Host Mobility Management Protocol Extending SIP to 3G-IP Networks," Internet Engineering Task Force, Internet Draft, Oct. 1999.
Campbell and Sparks, "Control of Service Context Using SIP Request—URI," Network Working Group, Apr. 2001.
Ericsson, www.telecomcorridor.com/wireless%20horizons/1Coyne.pdf, printed from the World Wide Web on Jun. 27, 2001.
Dirk Kutscher/Jorg Ott, "The Message Bus—A Communication & Integration Infrastructure for Component-Based Systems," White Paper, Jan. 2000.
Ott et al., "A Message Bus for Local Coordination," Network Working Group, Internet-Draft, May 30, 2001.
Perkins, "IP Mobility Support," Internet Engineering Task Force Request for Comment 2002, Oct. 1996.
Perkins, "IP Encapsulation within IP," Internet Engineering Task force Request for Comments 2003, Oct. 1996.
Perkins, "Minimal Encapsulation with in IP," Internet Engineering Task Force Request for Comments 2004, Oct. 1996.
Solomon, "Applicability Statement for IP Mobility Support," Internet Engineering Task Force Request for Comments 2005, Oct. 1996.
Handley et al., "SDP: Session Description Protocol," Internet Engineering Task Force Request for Comment 2327, Apr. 1998.
Handley et al., "SIP: Session Initiation Protocol," Internet Engineering Task Force Request for Comment 2543, Mar. 1999.
Fielding et al., "Hypertext Transfer Protocol—HTTP/1.1," Internet Engineering Task force Request for Comment 2616, Jun. 1999.
Rigney et al., "Remote Authentication Dial in User Service (RADIUS)," Internet Engineering Task Force Request for Comment 2865, Jun. 2000.
Rigney, "RADIUS Accounting," Internet Engineering Task Force Request for Comment 2866, Jun. 2000.
OMA, Discussion and definitions on PoC Floor Control, Input Contribution, Doc #OMA-REQ-2003-0375-PoC_Floor_Control, Jun. 2, 2003.
OMA, "PoC Use case: Mobile—PC Example," Input Contribution, Doc #OMA-REQ-2003-0323 PoC Mobile-PC use case, May 5, 2003.
OMA, "PoC Use case: Multimedia Group Call Example," Input Contribution, Doc #OMA-REQ-2003-0306-PoC UseCase-group-multimedia-scenario, May 6, 2003.
OMA, "PoC Use case: Examples of User Requirements," Input Contribution, Doc #OMA-REQ-2003-0305-PoC Use Case, May 6, 2003.
OMA, "Inputs for PoC Requirements Document," Input Contribution, Doc #OMA-Req-2003-0367-PoC_Input_Motorola, May 29, 2003.
OMA, "Push to Talk over Cellular (PoC)," Version: 0.1.6, May 12, 2003.
"cdman2000 Phase 1 MAC (IS-2000-3) Ballot Comment Resolution Text", MAC Ad Hoc Group, Jul. 1999.
"Interoperability Specification (IOS) for CDMA 2000 Access Network Interfaces—Part 3 Features", 3$^{rd}$ Generation Partnership Project 2 '3GPP2', Nov. 2001.

\* cited by examiner

METHOD FOR CALL SETUP USING SHORT DATA BURSTS

FIELD OF THE INVENTION

The present invention relates generally to wireless telecommunication networks. More particularly, it relates to a method for call setup in a wireless telecommunications network.

BACKGROUND OF THE INVENTION

In an exemplary wireless communications network, each wireless device may communicate via an air interface with a base transceiver station ("BTS") and in turn with a base station controller ("BSC"). The BSC may then be coupled with a mobile switching center ("MSC"). Further, the BSC may be coupled with a packet data serving node ("PDSN") or other gateway, which may provide connectivity with an IP network, such as the public Internet or a private intranet (e.g., a wireless carrier's core IP network). The wireless device may thus communicate with entities on the IP network via communication path comprising the air interface, the BTS, the BSC and the PDSN.

A properly equipped wireless device can initiate packet-data communication by sending an initiation request message over an air interface signaling channel, and via the BSC, to the MSC. Applying industry standards, the initiation request message may include a "packet data" service option code that characterizes the requested communication as packet-data communications, as compared with traditional voice communication. When the MSC receives the initiation request, it may then detect the "packet data" service option code and responsively send the message back to the BSC for handling.

In turn, when the BSC receives the initiation request from the MSC, the BSC may establish a radio link layer connection with the wireless device, by assigning the wireless device to operate on a particular traffic channel over the air interface (e.g., a fundamental traffic channel, and perhaps one or more supplemental channels). In addition, the BSC may pass the initiation request to the PDSN. The PDSN and the wireless device may then negotiate with each other to establish a data-link layer connection, typically a point-to-point session ("PPP") over which packet data can be communicated between the wireless device and the PDSN.

In most wireless communication systems like this, the radio-link layer connection with the wireless device may time-out after a predefined period of inactivity. For instance, after ten seconds in which no data is communicated to or from the wireless device over the air interface, the BSC may release the traffic channel that had been assigned to the wireless device. At the same time, however, the data-link layer (e.g., PPP) connection with the wireless device might remain.

Once the radio-link layer connection with the wireless device has timed out, the wireless device will be considered "dormant." However, if its data-link layer connection still exits, the wireless device may still seek to send packet data to other entities, and other entities may seek to send packet data to the wireless device. When another entity seeks to send packet data to the wireless device, the BSC will page the wireless device over a signaling channel.

When the wireless device seeks to send data, for example in order to establish a session with a second device, such as a wireless device or a wired device, the radio link layer connection with the wireless device will need to be reestablished. To do so, the wireless device may send a message to the BSC over the signaling channel requesting radio-link resources, and the BSC may then assign a traffic channel to the wireless device. Then the wireless device can use the traffic channel to communicate with the second device. For example, the wireless device may then send a request to establish a session, such as a Session Initiation Protocol ("SIP") INVITE message, to the second device via the traffic channel.

If the second device is also a wireless device, it may also be in the dormant state, in which case a BSC for the second device would need to establish a traffic channel with the second device before forwarding to it the SIP INVITE message. After receiving the SIP INVITE message via the established traffic channel with the BSC, the second device could then respond to the message, such as by sending the first wireless device a SIP OK message via the established traffic channels.

This process, however, introduces a latency in establishing the session. Before sending a request to establish a session, the first wireless device establishes a traffic channel with its BSC, which can take on the order of 2-3 seconds. Similarly, if the second device is also a wireless device, it may establish a traffic channel before receiving the request. This can also take on the order of 2-3 seconds. Thus, merely establishing the traffic channels may introduce a latency of approximately 2-3 seconds in a session involving one wireless device, and a latency of approximately 4-6 seconds in a session involving two wireless devices. It should be understood that these times are exemplary in nature and may vary depending on the type of wireless network and on other factors.

The latency can be noticeable, for example, to a wireless device user establishing a session between the two wireless devices in order to place a voice call, such as may be done by using the Voice over Internet Protocol ("VoIP") to send voice traffic over a packet-data connection.

Therefore, there exists a need for an improved method of call setup in a wireless telecommunications network.

SUMMARY OF THE INVENTION

A first wireless device may communicate with a wireless telecommunications network, such as a CDMA2000 3G network, over an air interface. The air interface may include a traffic channel and a signaling channel, each of which may be used by the first wireless device to send and receive data via the wireless telecommunications network.

In one embodiment, the first wireless device may initiate a session with a second device by sending a request to the second device over the signaling channel of the first wireless device's air interface, and the request may be sent over the signaling channel using short data bursts. The first wireless device may also establish a traffic channel, which can then be used by the first wireless device to communicate with the second device in the established session.

In another embodiment, the second device may initiate a session with the first wireless device. For example, the second device may send a request to establish a session to the first wireless device. The request may be sent to the first wireless device via the air interface signaling channel using short data bursts. The first wireless device may then establish a traffic channel, which can be used to communicate with the second device in the established session.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Exemplary Architecture

Figure 1:
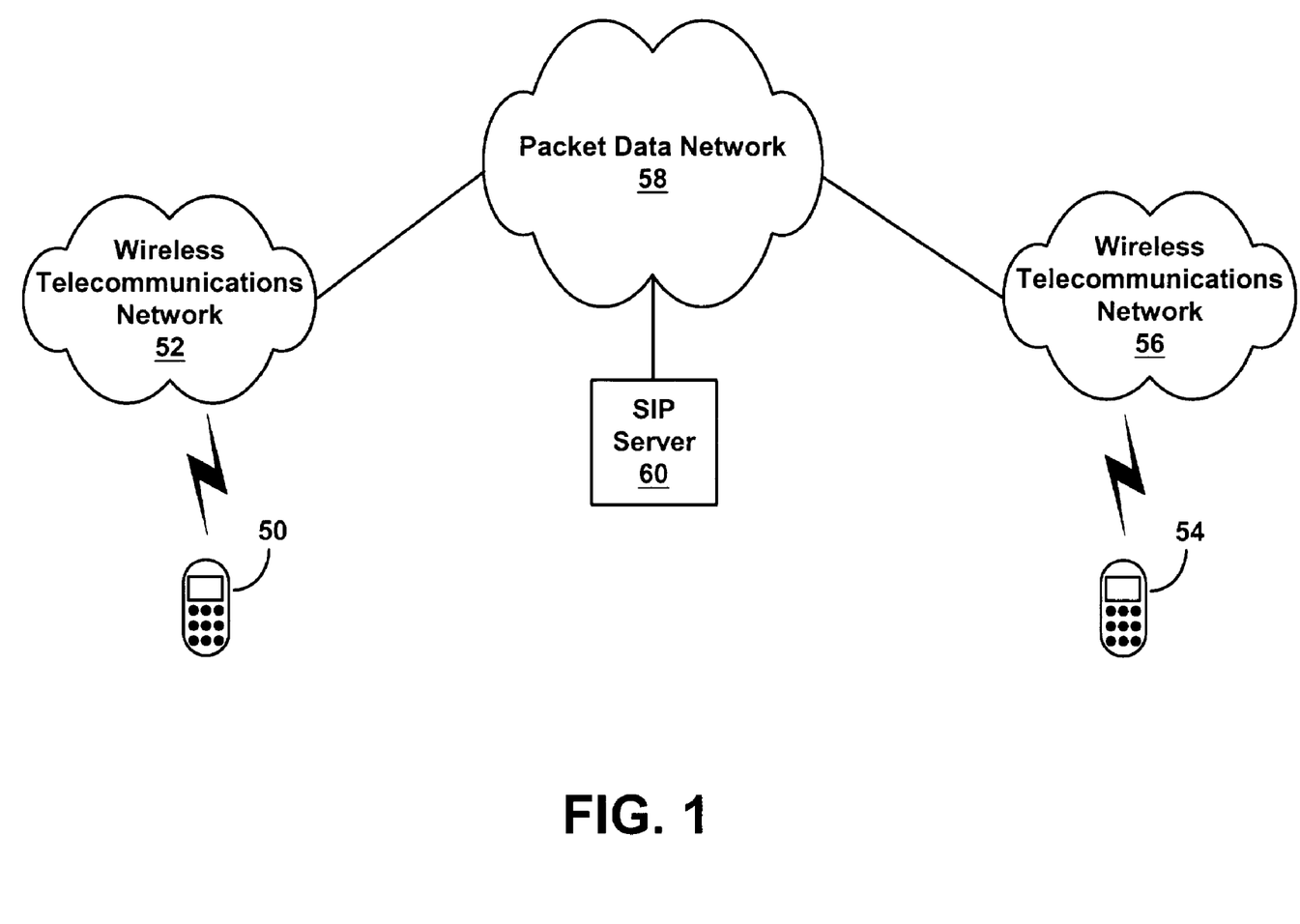
FIG. 1 is an exemplary wireless communication system that uses short data burst for call setup between first and second wireless devices.

FIG. 1 is an exemplary wireless communication system in which a first wireless device uses short data bursts for call setup with a second device. As shown in FIG. 1, a first wireless device 50 connects with a wireless telecommunications network 52. The first wireless device 50 communicates with the second device, which as shown in FIG. 1 is a second wireless device 54 that connects to a second wireless telecommunications network 56. The two telecommunications networks 52, 56 interface via a packet data network 58, such as the Internet, thereby allowing the two wireless devices 50, 54 to communicate with each other.

The configuration described in FIG. 1, however, is merely exemplary in nature, and various different alternate embodiments are also possible. In one alternate embodiment, the second device is a wired device. The second device may connect to the packet data network 58 via a wired connection, and the packet data network 58 in turn interfaces with the wireless telecommunications network 52. In another alternate embodiment, the second device may be a wired device that connects to the packet data network 58 through one or more other data networks.

In another alternate embodiment, the second device connects to the public switched telephone network ("PSTN"), which in turn interfaces with the wireless telecommunications network 52. In yet another alternate embodiment, the second device may be a wireless device that connects to the same wireless telecommunications network 52 as the first wireless device 50. Other different configurations are also possible. Thus, while the subsequent discussion refers to the configuration described in FIG. 1, it should be understood that the principles described with respect to FIG. 1 may be applied to these or other alternate embodiments.

With continued reference to FIG. 1, the first wireless device 50 communicates with the wireless telecommunications network 52 over an air interface. The air interface can be divided into two or more channels, such as a signaling channel and a traffic channel. The signaling channel is generally shared among multiple different wireless devices connected to the wireless telecommunications network 52, and it can be used to send control messages to the wireless devices. The traffic channel, on the other hand, can be used to send voice and data between the two wireless devices 50, 54.

Each wireless device connected to the wireless telecommunications network 52 generally uses its own traffic channel, which is assigned to it by the wireless telecommunications network 52. Thus, the first wireless device 50 communicates with the wireless telecommunications network 52 via the signaling channel in order to establish its own traffic channel. The first wireless device 50 then uses its own traffic channel to communicate with other devices, such as the second wireless device 54. The second wireless device 54 may similarly use a common signaling channel with the wireless telecommunications network 56 in order to establish its own traffic channel, which it may then use to communicate with the first wireless device 50.

In addition to carrying control messages used to establish a traffic channel, the air interface signaling channel may be used by the first wireless device 50 to establish a session with the second wireless device 54. The session may be any type of session. For example, the wireless devices 50 may use its respective signaling channel to establish a Voice over Internet Protocol ("VoIP") session with the second wireless device 54. VoIP can be used to send voice traffic between the two wireless devices 50, 54 via the packet data network 58. Thus, VoIP is a packet-switched alternative to the traditional circuit-switched connection for voice calls.

One way to establish a VoIP session between the two wireless devices 50, 54 is by using the Session Initiation Protocol ("SIP"). SIP provides a generic signaling format that can be used to establish a session between two devices. SIP is not limited to establishing a VoIP session, but it may be used establish a variety of other sessions, such as a push to talk ("PTT") session (e.g., a two-way radio session). Alternatively, the wireless devices 50, 54 may use protocols other than SIP to establish a session. SIP is described in more detail in IETF RFC 2543, which is incorporated herein by reference in its entirety.

A SIP server 60 provides functionality needed to establish a session between the two wireless devices 50, 54 using SIP. While FIG. 1 depicts the SIP server 60 connected to the packet data network 58, it may alternatively reside in different locations. For example, the SIP server 60 may reside on one of the wireless telecommunications networks 52, 56. In another example, the SIP server 60 may reside on another data network accessible by the first and second wireless devices 50, 54.

The SIP server 60 can support a number of different SIP functions. For example, the SIP server 60 can perform the functions of a SIP registrar server and a SIP proxy server. The SIP server 60 may also perform other functions. These various functions may all be included in the SIP server 60, as shown in FIG. 1. Alternatively, the functions may be distributed among two or more servers, for example, a SIP registrar server and a SIP proxy server. The two servers may be located on the packet data network 58, on one of the wireless telecommunications network 52, 56 or on another network by the first and second wireless devices 50, 54. Alternatively, the servers may each be located at different locations.

The SIP server 60 can act as an intermediary between the first and second wireless devices 50, 54, and it can aid in establishing the session between the first and second wireless devices 50, 54. For example, the first wireless device 50 may identify the second wireless device 54 using a static identifier, such as an e-mail address. While the first wireless device 50 may know the static identifier for the wireless device 54, the current routable address for the second wireless device 54 may continually change. The SIP server 60 can resolve the static identifier into the wireless device's current routable address, such as its Internet Protocol ("IP") address, thereby allowing the second wireless device 54 to send data to the wireless device's current location.

Generally, a SIP client, such as an application program, runs on the first wireless device 50. The SIP client registers its current location with the SIP server 60, such as by sending the SIP server 60 its current IP address. Using the current addressing information stored by the SIP server 60, the second wireless device 54 can contact the SIP client to establish a data session with the first wireless device 50. For example, the SIP server 60 can receive SIP messages from the second wireless device 54 that are addressed to the SIP client on the first wireless device 50 using a static identifier. Then, the SIP server 60 can forward the SIP messages received from the second wireless device 54 to the SIP client on the first wireless device 50 using the wireless device's current IP address.

In another example of using the SIP server 60 to establish a SIP session between the first wireless device 50 and the second wireless device 54, the SIP server 60 can receive a request from the second wireless device 54 for the current location of the SIP client. The request may identify the SIP client using a static identifier. In response to the message, the SIP server 60 may provide the wireless device 54 with the wireless device's current IP address. Then, the second wireless device 54 can send SIP messages directly to the first wireless device 50 using the wireless device's IP address.

In accordance with the exemplary embodiment, SIP messages can be sent over one or more of the respective air interface signaling channels of the wireless telecommunication networks 52, 56 using short data bursts ("SDBs"). SDB provides a format for sending messages over the air interface signaling channel of a wireless telecommunications network. Thus, the first wireless devices 50 uses SDBs to send messages over the air interface signaling channel of its wireless telecommunications network 52, and the second wireless device may use SDBs to send messages over the air interface signaling channel of its wireless telecommunications network 56.

By using SDBs to send SIP messages over the air interface signaling channels of one or both of the wireless telecommunication networks 52, 56, the wireless devices 50, 54 can proceed to establish a session between them without both wireless devices 50, 54 first having to establish traffic channels. This can reduce the latency that would otherwise occur during call setup if each wireless devices 50, 54 had to first establish a traffic channel with its respective wireless telecommunications network 52, 56 before exchanging SIP messages in order to establish a session.

Thus, in one embodiment, the first and second wireless devices 50, 54 each use SDBs to communicate with their respective wireless telecommunication networks 52, 56 and to establish a session between the two devices 50, 54. In another embodiment, the first wireless device 50 uses SDBs to communicate with its wireless telecommunications network 52 and establish a session with the second wireless device 54, while the second wireless device 54 does not use SDBs to communicate with its wireless telecommunications network 56. In another embodiment, the second device may be a wired device, in which case only the first wireless device 50 would use SDBs.

Figure 2:
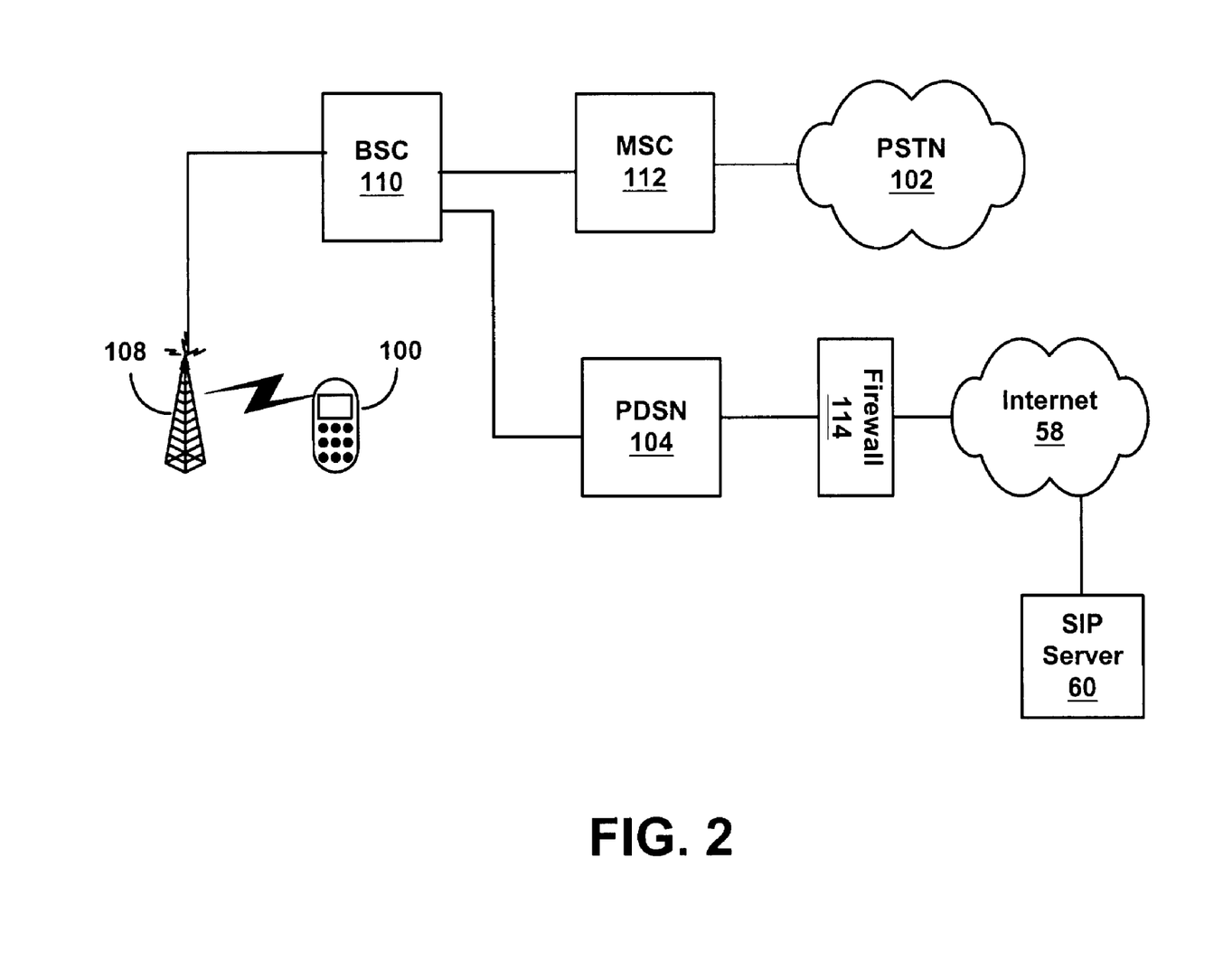
FIG. 2 shows an exemplary architecture for a wireless telecommunications network that may be used as either or both of the wireless telecommunications networks depicted in FIG. 1.

FIG. 2 shows an exemplary architecture for a wireless telecommunications network that may be used as either or both of the wireless telecommunications networks 52, 56 depicted in FIG. 1. In one exemplary embodiment, a wireless device 100, such may be the first or second wireless device 50, 54 depicted in FIG. 1, connects with the wireless telecommunications network over a wireless interface. In turn, the wireless telecommunications network may provide connectivity to the public switched telephone network ("PSTN") 102. The wireless telecommunications network may also provide connectivity to a packet data serving node ("PDSN") 104, which in turn can provide connectivity to a packet data network, such as the packet data network 58 shown in FIG. 1. Through this connectivity, the wireless device 100 may communicate with a device on one of these networks.

The wireless device 100 may be a wireless telephone, a personal digital assistant ("PDA"), a pager, a two-way radio, a wirelessly equipped computer or another wireless device. While FIG. 2 depicts one wireless device 100 connected to the wireless telecommunications network, the wireless telecommunications network may include a plurality of wireless devices. Also, more than one type of wireless device may connect to the wireless telecommunications network, and different types of wireless devices may each connect to the wireless telecommunications network.

As shown in FIG. 2, the wireless device 100 links to a base transceiver station ("base station") 108 through an air interface. The wireless device 100 can communicate with the base station 108 using a variety of different protocols. In an exemplary embodiment, the wireless device 100 communicates with the base station 108 using Code Division Multiple Access ("CDMA"), such as in a CDMA2000 3G packet data network.

Other wireless protocols may also be used. For example, the wireless device 100 and the base station 108 may communicate using Wideband CDMA ("WCDMA"), Time Division-Synchronous CDMA ("TD-SCDMA"), Advanced Mobile Phone Service ("AMPS"), Digital AMPS ("D-AMPS"), Universal Mobile Telecommunications System ("UMTS"), Global System for Mobile Communication ("GSM"), General Packet Radio Services ("GPRS"), IS-136, Wireless Application Protocol ("WAP"), Time Division Multiple Access ("TDMA") or other protocols. Additional wireless protocols, such Institute of Electrical and Electronics Engineers ("IEEE") 802.11, Bluetooth and others may also be used.

CDMA provides a method for sending wireless signals between the wireless device 100 and the base station 108. In a CDMA system, the base station 108 communicates with the wireless device 100 over a spread spectrum of frequencies. In a CDMA system, multiple wireless devices may use the same frequency range, and the multiple wireless devices may each simultaneously communicate with the base station 108 using the same frequency range.

The wireless device 100 in a CDMA system spreads its signal across the frequency range. Spreading the signal across a wide bandwidth, such as approximately 1.266 MHz, can reduce interference between signals from different wireless devices. This can allow individual signals to be differentiated from other signals, and therefore, to be accurately recovered. In order to perform signal spreading, each wireless device may be assigned a unique code, such as a Walsh code. The code may be a sequence of bits, such as a 64 bit binary number; however, other lengths may also be used. The wireless device 100 and the base station 108 may then use the code to encode and decode signals sent between them.

The wireless device 100 can communicate with the base station 108 via the air interface using several different channels. For example, the wireless device can communicate with the base station 108 via the air interface using a signaling channel. The signaling channel can be a common channel shared by multiple wireless devices communicating with the base station 108. The signaling channel can be used to send control information and to establish a traffic channel between the wireless device 100 and the base station 108. The signaling channel may additionally include various different sub-channels, each of which can be used for signaling.

The traffic channel can be used to send voice or data traffic between the wireless device 100 and the base station 108. In contrast to the signaling channel that is shared among multiple wireless devices, the traffic channel is used by a single wireless device to communicate with the base station 108. The base station 108 can support multiple, simultaneous traffic channels with different wireless devices. Each traffic channel with a wireless device may in fact comprise multiple traffic sub-channels. For example, a forward traffic channel can be used to send data to the base station 108, while a reverse traffic channel may be used to receive data from the base station 108.

The wireless device 100 and the base station 108 can communicate via the signaling channel using SDBs. SDB is defined by various CDMA implementations, and it provides a generic packet format for sending data between the wireless device 100 and the base station 108 via the signaling channel. The wireless device 100 can encapsulate other packets layers into the data portion of one or more SDB packets, which are then transmitted via the signaling channel to the base station 108. SDB may be used, for example, to exchange packets with the wireless device 100 while the wireless device is in the dormant state and thus does not have an established traffic channel.

While the exemplary embodiments describe using SDBs to send packets over a CDMA signaling channel, it should be understood that various other protocols may also be used to transmit packets over the signaling channel of a CDMA network. These other protocols may be defined in a CDMA standard, or they may be proprietary protocols. It should be further understood that while the exemplary embodiments describe a CDMA network, they are not limited to CDMA networks. Thus, the exemplary embodiments may be applied to various different wireless networks. For example, the exemplary embodiments may use any wireless network that includes two or more different channels, such as a traffic channel and a signaling channel.

Figure 3:
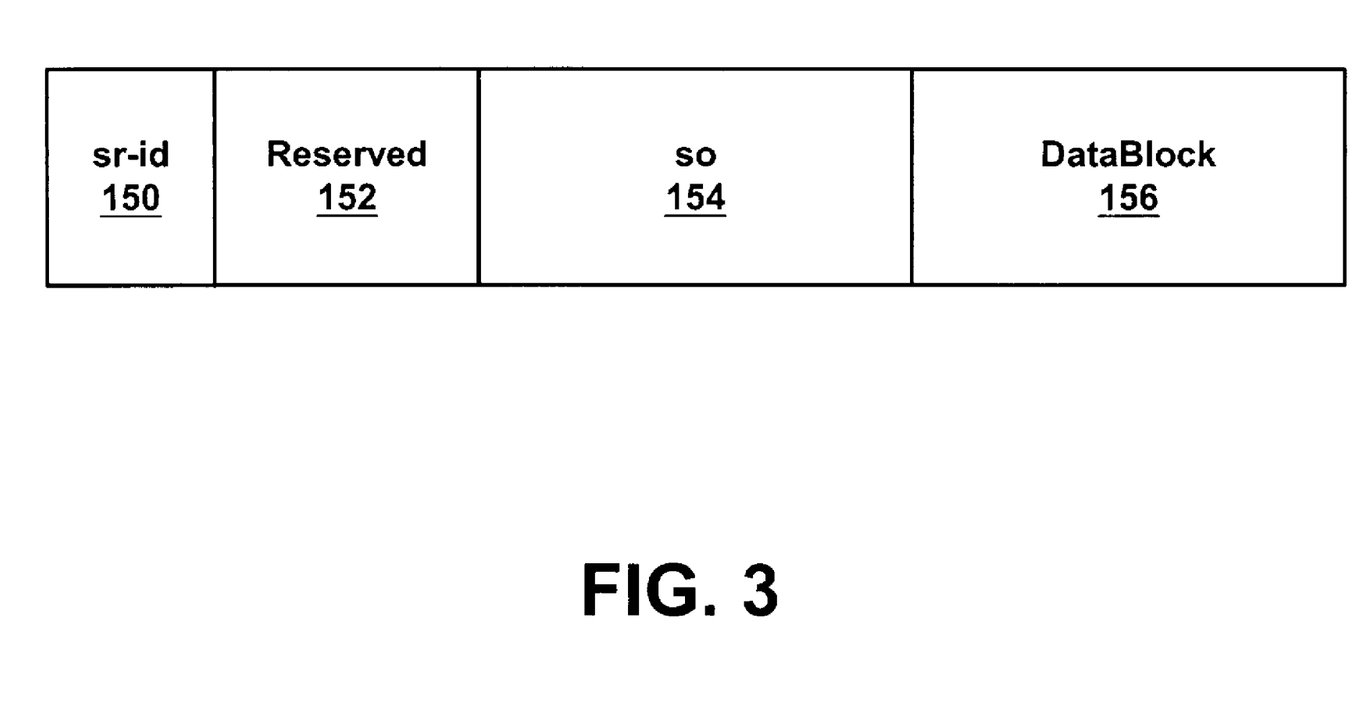
FIG. 3 is a block diagram of an exemplary SDB packet, such as can be used by the first and second wireless device of FIG. 1.

FIG. 3 is a block diagram of an exemplary SDB packet. An sr-id field 150 may be a 3-bit service reference identifier, which the wireless device 100 or the base station 108 sets to the service reference identifier of the SDB data service operating at the link layer. The reserved field 152 is a 5-bit field that is reserved for future use, and it is ordinarily set to all zeros. The so field 154 is a 16-bit field that the wireless device 100 or base station 108 sets to the service option number of the data service. The DataBlock field 156 is a variable length field that includes the data carried by the SDB packet.

SDB is described in more detail in "Interoperability Specification (IOS) for CDMA 2000 Access Network Interfaces— Part 3 Features," 3GPP2 A.S0013-0, $3^{rd}$ Generation Partnership Project 2, Nov. 16, 2001, which is incorporated by reference herein in its entirety. CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

Referring to FIG. 2, the base station 108 couples to a base station controller ("BSC") 110, which can perform various functions such as managing handoffs of the wireless device 100 as it moves among base stations. The BSC 110 in turn connects to a mobile switching center ("MSC") 112. The MSC 112 can manage setup and teardown of connections with the wireless device 100. While the BSC 110 and the MSC 112 are depicted as separate components, it is possible that their functionality may be combined into a single component.

The MSC 112 can additionally provide connectivity to the PSTN 102. Using the connectivity, the wireless device 100 may then communicate with another device that is also connected to the PSTN 102 or another device on the wireless telecommunications network. For example, the wireless device 100 could communicate with another phone that connects to the PSTN 102. Alternatively, the wireless device 100 could communicate with other devices, such as computers, personal digital assistants ("PDAs"), fax machines, printers, Internet appliances or and other devices. Additionally, the wireless device 100 may communicate with more than one device connected to the PSTN 102.

In addition to connecting to the MSC 112, the BSC 110 may also connect with a PDSN 104. The PDSN 104 can provide connectivity to a packet data network, such as the packet data network 58, an intranet or another network. The PDSN 104 may connect to the packet data network 58 through a firewall 114. The firewall 114 can be used to provide protection for the PDSN 104, for example by restricting access from the packet data network 58 back through the firewall 114 to the PDSN 104. Once the wireless device 100 connects to the packet data network 58, for example, it can exchange data with other devices that are also connected to the packet data network 58.

For example, the wireless device 100 can communicate with a computer or other device that connects to the packet data network 58. Of course, the wireless device could communicate with other devices connected to the packet data network 58, such as PDAs, fax machines, printers, Internet appliances or other network devices. Additionally, the wireless device 100 may communicate with another wireless telecommunications network that interfaces with the packet data network 58. Using this connectivity, the wireless device 100 could then communicate with another wireless device on the other wireless telecommunications network.

In connecting its own wireless telecommunications network, the wireless device 100 may establish a Point-to-Point Protocol ("PPP") session with the PDSN 104. As is known in the art, PPP can be used as a data link protocol for communication between two devices. PPP can provide a method for framing data sent between the two devices. Additionally, it can implement a link control protocol for controlling transmission links between the two devices, and it can provide a way to negotiate higher-level protocol options for communication between the two devices.

As a further part of establishing the PPP session, the wireless device 100 may be assigned an IP address. This may be done, for example, after the wireless device 100 has been authorized to access the wireless telecommunications network. The wireless device 100 may use the IP address to communicate in data sessions with other devices. While the wireless device 100 may have a pre-assigned IP address, its IP address is usually assigned at connection time. This may be done, for example, by using a Dynamic Host Control Protocol ("DHCP") application program. The DHCP application program may run on the PDSN 104, or it may run on another element. When the wireless device 100 establishes a PPP session with the PDSN 104, the DHCP application program may assign the wireless device 100 an IP address to use for that connection.

PPP is described in more detail in Internet Engineering Task Force ("IETF") Request for Comments ("RFCs") 1661, 1662 and 1663, all of which are incorporated herein by reference in their entirety. DHCP is described in more detail in IETF RFCs 1541, 2131, 2132, which are all incorporated herein by reference in their entirety.

Once connected to the PDSN 104, for example through a PPP session, the wireless device 100 can access the packet data network 58. While the wireless device 100 may communicate with the PDSN 104 through a PPP session, it may communicate with other devices using higher-level protocols. For example, the wireless device 100 may use the Transmission Control Protocol ("TCP") and IP to communicate with other devices on the packet data network 58.

TCP/IP is one protocol suite that may be used for transmitting data over a packet-switched network. IP provides a method for transmitting data between devices on the same or on different networks. TCP is a connection-oriented protocol used to send data between devices connected over a network, and it provides additional features over IP, such as reliable end-to-end transmission of data. When used in conjunction, TCP and IP provide a format for breaking a data message into packets, transmitting the packets over the network to a receiver, and reassembling the packets at the receiver to form the original data message. Other protocols, such as the Universal Datagram Protocol ("UDP"), may also be used.

IP is described in more detail in IETF RFC 791, which is incorporated herein by reference in its entirety. TCP is described in more detail in IETF RFC 793, which is incorporated herein by reference in its entirety. UDP is described in further detail in IETF RFC 768, which is incorporated herein by reference in its entirety.

With reference to FIG. 1, the first wireless device 50 on the first wireless telecommunications network 52 can engage in a TCP/IP session with the second wireless device 54 on the second wireless telecommunications network 56. The first and second wireless devices 50, 54 can exchange data via the packet data network 58 using TCP/IP packets. The TCP/IP packets can be sent from the first wireless device 50 to the second wireless device 54, and they can also be sent from the second wireless device 54 to the first wireless device 50.

Once connected to the cellular network for a data session, such as by starting a PPP session with the PDSN 104 and receiving an IP address, the first wireless device 50 can communicate with the other wireless device 54 via the packet data network 58. The first wireless device 50 and the wireless device 54 can both use SIP to establish a session between them. A SIP server 60 can be used to route messages between the two devices 50, 54 in order to establish the session.

Figure 4:
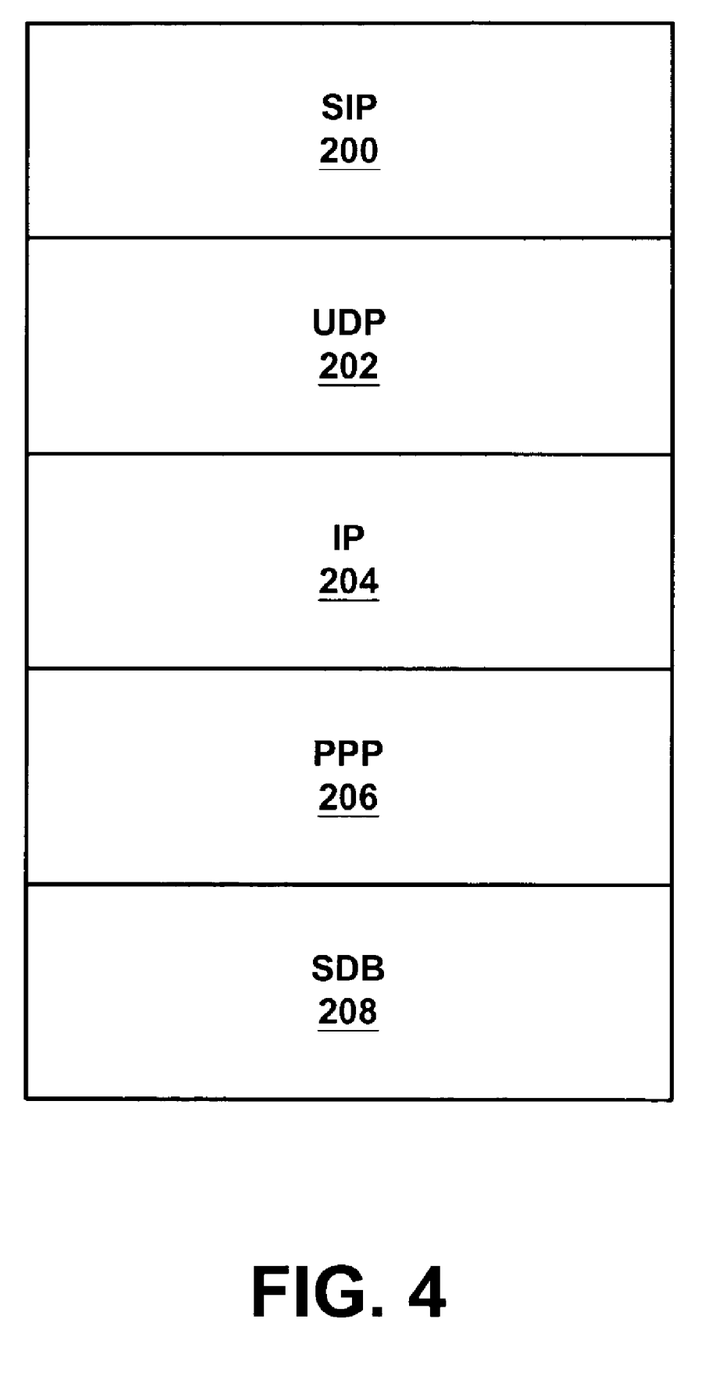
FIG. 4 is a block diagram of an exemplary protocol stack for using short data bursts to establish a session between the first and second wireless devices of FIG. 1.

FIG. 4 is a block diagram of an exemplary protocol stack for using short data bursts to establish a session between the first and second wireless devices. The protocol stack includes a SIP Layer 200, a UDP Layer 202, an IP Layer 204, a PPP Layer 206 and a SDB Layer 208. Packets in the SIP Layer 200, the UDP Layer 202 and the IP Layer 204 primarily use the first and second wireless devices 50, 54 as their endpoints. In contrast, packets in the PPP Layer 206 and the SDB Layer 208 generally do not have both wireless devices 50, 54 as their endpoints.

At the SIP Layer 200, the first wireless device 50 can form SIP packets to send to the other wireless device 54. Then, at the UDP Layer 202, the SIP packets can be encapsulated into UDP packets, such as by placing the SIP packets in the data portion of the UDP packets. It should be understood, however, that SIP is merely exemplary in nature and the UDP packets at the UDP Layer 202 may carry other protocols, including proprietary protocols. Of course, another protocol, such as TCP, could be used in place of UDP. The UDP packets are then encapsulated into IP packets at the IP Layer 204. Similarly, this can be done by placing the UDP packets into the data portion of the IP packets. These packets are generally formed at one of the wireless devices 50, 54 and use the other first wireless device 50, 54 as the destination endpoint.

At the PPP Layer 206, the IP packets can be encapsulated into PPP packets. As previously described, the PPP connection is usually formed between a wireless device and a PDSN 104. Thus, the wireless device and the PDSN would be the endpoints of the PPP packets. The IP packets, which themselves may hold higher-level packets, can be encapsulated into PPP packets for transmission from the first wireless device 50 to a PDSN on the wireless telecommunication network 52. At the PDSN, the IP packets are extracted from the PPP packets. Of course, the IP packets may then be placed in other lower level packets for transmissions across the various other network paths before being received at their ultimate destination.

Before transmission from the first wireless device 50 to the PDSN, the PPP packets may be encapsulated into SDB packets, and this occurs at the SDB Layer 208. As previously discussed, SDBs may be used to transmit packets between the first wireless device 50 and its base station 108 via the air interface signaling channel. When the SDB packets are received at the base station 108, the PPP packets can be extracted and forwarded to the PDSN 104.

A similar packet flow can be used for the second wireless device 54. The second wireless device 54 can use SDBs to send packets between itself and a base station for its wireless telecommunications network 56. Similarly, the second wireless device 54 can use PPP packets to send data between itself and a PDSN on its wireless telecommunications network 56. The wireless device 54 can also exchange IP packets with the first device 50, which may themselves carry higher level protocol packets such as UDP packets or SIP packets.

2. Exemplary Operation

Figure 5:
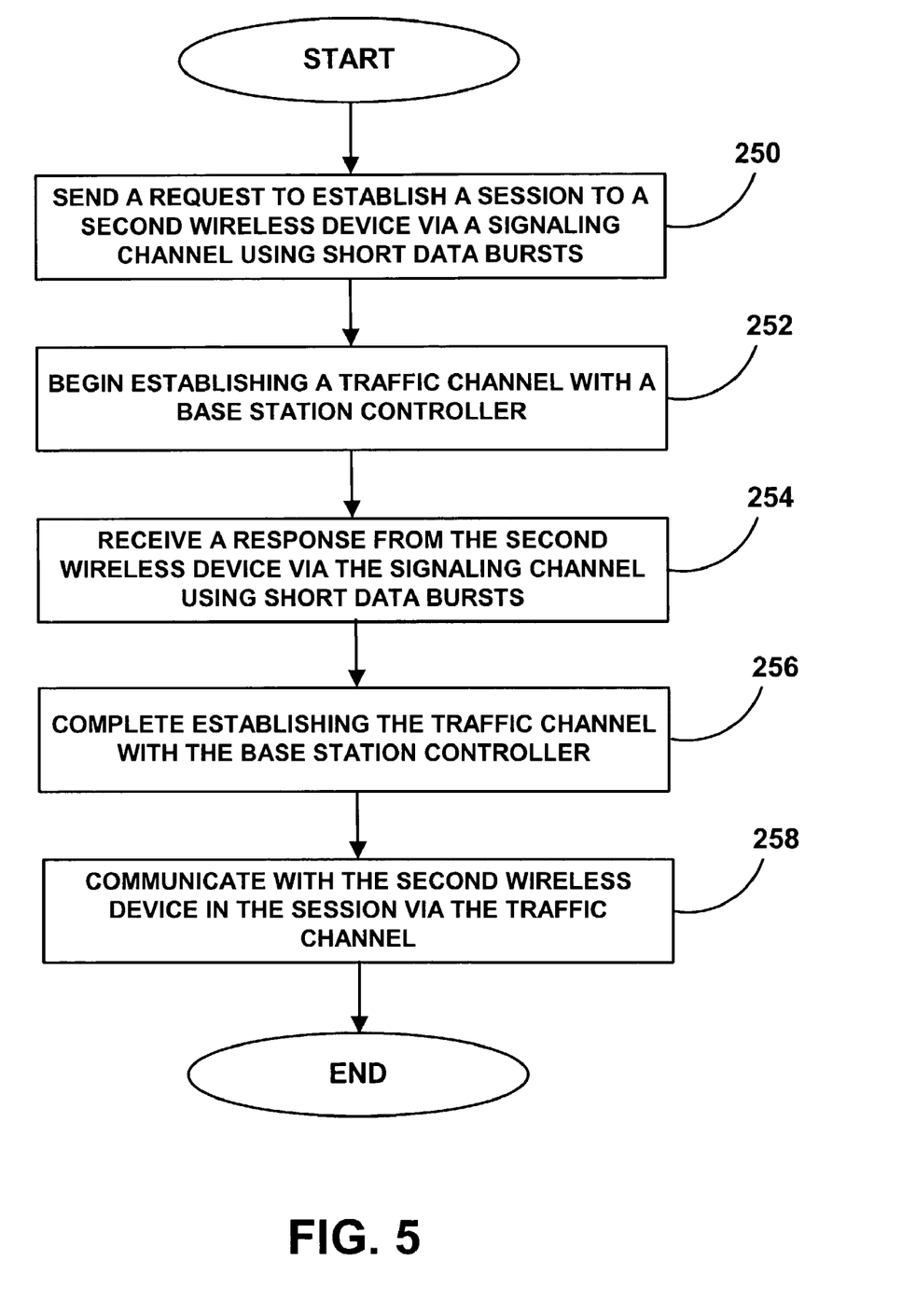
FIG. 5 is a flowchart of an exemplary process for the first wireless device using short data bursts to initiate a session with the second wireless device.

FIG. 5 is a flowchart of an exemplary process for the first wireless device using short data bursts to initiate a session with the second wireless device. At Step 250, the first wireless device sends a request to establish a session to a second wireless device via a signaling channel for the first wireless device using short data bursts. For example, the first wireless device can send the second wireless device a SIP INVITE message, and the SIP INVITE message can be sent from the first wireless device to its base station over the signaling channel using short data bursts.

The SIP INVITE message may be further encapsulated into other packet layers, such as were described with reference to FIG. 4. For example, the SIP INVITE message may be placed into UDP packets. The UDP packets can then be placed inside IP packets, which are then placed inside PPP packets. Of course, the protocol stack described in FIG. 4 is merely exemplary in nature, and other protocols or layers may be used. Once the lowest level packets, such as PPP packets, have been formed, they may be placed inside short data burst packets for transmission over the air interface signaling channel.

As the short data burst packets generally carry a limited amount of data, the PPP packets, or other lowest level packets, may be split into multiple short data burst packets for transmission to the base station via the air interface signaling channel. Additionally, the original SIP packets, which were then encapsulated into other packets including the PPP packets, may be compressed. Compressing the SIP packets can reduce their size and thus also reduce the number of short data burst packets that would have to be send via the signaling channel in order to establish a session with the second wireless device. For example, the SIP messages can be compressed text-based SIP messages, SIP coded in binary format, or compressed SIP encoded in binary format. Additionally, they be compressed using another protocol or by using a proprietary compression protocol.

Then, at Step 252, the first wireless device begins establishing a traffic channel with its base station. For example, the first wireless device may be in the dormant state, thereby having previously released its traffic channel with the base station. Although it previously relinquished its traffic channel, the first wireless device may remain in a PPP session with its PDSN. By establishing the traffic channel the first wireless device can move from the dormant state to the active state, thereby again communicating in its PPP session and ultimately communicating with the second wireless device.

Of course, it is also possible that the first wireless device is in the active state and already has a traffic channel established with its base station. The first wireless device would then not need to establish a traffic channel because one would already exist. In that case, the request to establish the session, such as the SIP INVITE message, could be sent over either the traffic channel or the signaling channel. Also, it is possible that the first wireless device begins to establish the traffic channel before sending the request to establish the session via the air interface signaling channel to the second wireless device.

Then, at Step 254, the first wireless device receives a response from the second wireless device via the first wireless device's signaling channel using short data bursts. For example, the wireless device may receive a SIP OK message from the second wireless device, thereby indicating that the second wireless device will establish a session with the first wireless device. Of course, it is also possible that the first wireless device may receive a response from the second wireless device before it begins establishing the traffic channel with its base station.

At Step 256, the first wireless device completes establishing the traffic channel with the base station. While this generally occurs after the first wireless device receives a response from the second wireless device via the signaling channel, it is also possible that the first wireless device may complete establishing the traffic channel before the first wireless device receives a response from the second wireless device. In this case, the response from the second wireless device may be sent to the first wireless device via either the signaling channel or the traffic channel for the first wireless device.

Then, at Step 258, the first wireless device communicates with the second wireless device in the session via the traffic channel. For example, the first wireless device and the second wireless device may have established a VoIP session. Then, the first wireless device and the second wireless device may exchange voice traffic using the VoIP session. The first wireless device can send voice traffic over the traffic channel to its base station, and the voice traffic can then be routed via the packet data network to the second wireless device's base station. There, it can be sent over the traffic channel to the second wireless device.

Similarly, the second wireless device can send voice traffic to the first wireless device using the traffic channels. For example, the second wireless device can send VoIP packets to its base station via the established traffic channel. The VoIP packets can be routed via the packet data network to the wireless device's base station. The wireless device's base station can then send the packets to the wireless device over the established traffic channel.

While the flowchart of FIG. 5 depicts an exemplary process for the first wireless device using short data bursts to initiate a session with the second wireless device, the process may also be used by the second wireless device to establish a session with the first wireless device. Thus, in an embodiment where the second device is a wireless device instead of a wired device, the second wireless device may initiate the session with the first wireless device by sending a request to the first wireless device over the second wireless device's air interface signaling channel using short data bursts. However, it is also possible that the second wireless device may establish a session with the first wireless device by sending the request over its traffic channel, which may be already established or which the second wireless device may establish before sending the request.

Figure 6:
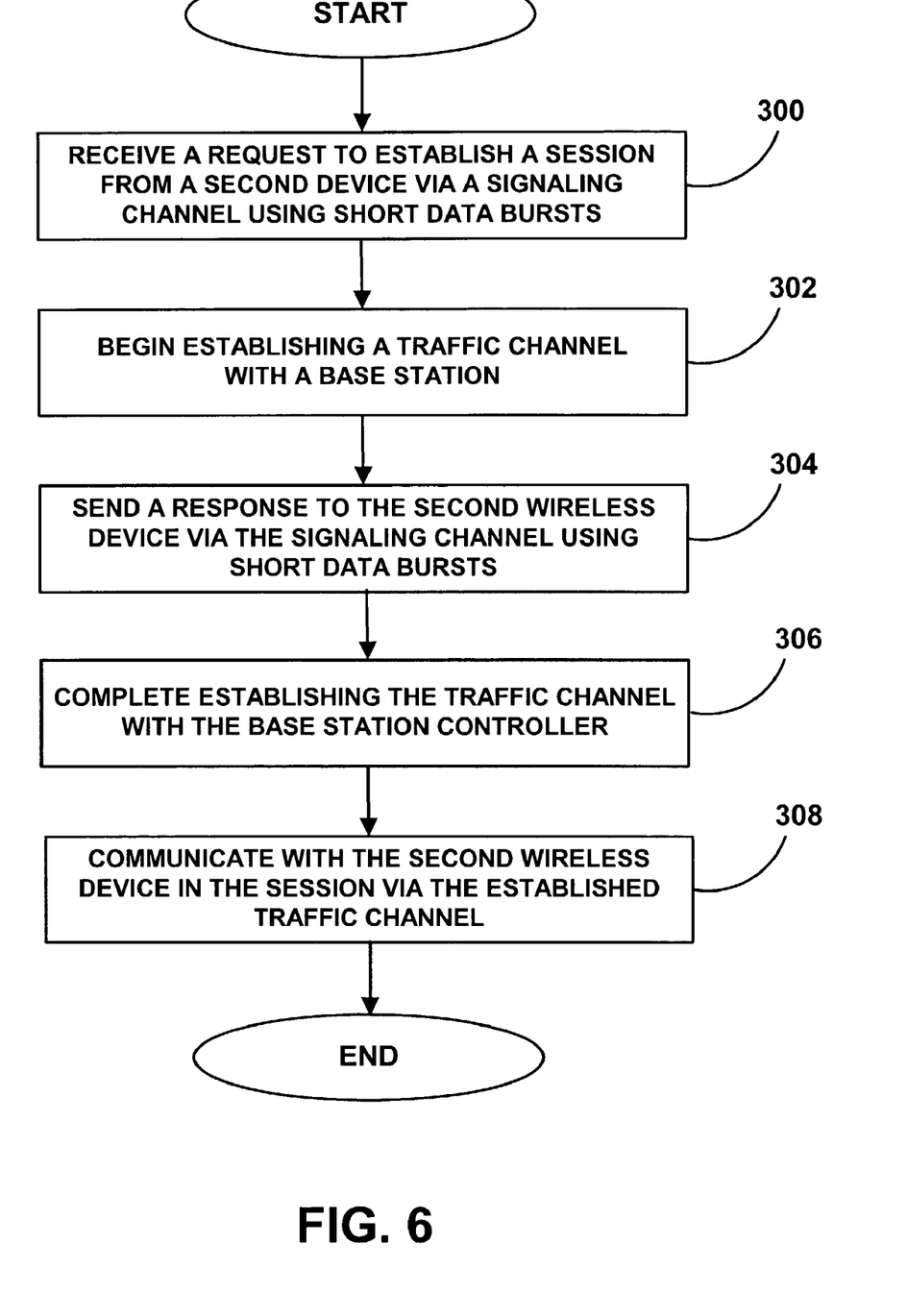
FIG. 6 is a flowchart of an exemplary process for the first wireless device using short data bursts to respond to a request to establish a session received from the second wireless device.

FIG. 6 is a flowchart of an exemplary process for the first wireless device using short data bursts to respond to a request to establish a session received from the second wireless device. For example, in an embodiment where the second device is a wireless device or a wired device, it may initiate a session with the first wireless device by sending it a request to establish a session. At Step 300, the first wireless device receives a request to establish a session from the second wireless device. The first wireless device receives this request via a signaling channel its base station, and the request is sent over the signaling channel using short data bursts. For example, the first wireless device may receive the SIP INVITE message sent from the second wireless device. The SIP INVITE message may be routed to the base station for the first wireless device, where it is then sent to the first wireless device via the signaling channel using short data bursts.

At Step 302, the first wireless device begins establishing a traffic channel with its base station. For example, the first wireless device can be in a dormant state and not have an active traffic channel with its base station, although it may maintain a PPP session with its PDSN. The first wireless device can then start to establish a traffic channel with its base station.

It is also possible that the first wireless device is already in the active state, and thus already has a traffic channel established with the base station. In this case, the first wireless device would not need to establish the traffic channel with its base station, because a traffic channel already exists. Then, the request from the second wireless device, such as the SIP INVITE message, can be sent to the first wireless device using either the signaling channel or the traffic channel.

At Step 304, the first wireless device sends a response to the second wireless device via the signaling channel for the first wireless device using short data bursts. As previously described, the first wireless device receives a message from the second wireless device, such as a SIP INVITE message. The first wireless device can then respond with an appropriate message, such as with as SIP OK message in response to the SIP INVITE message received from the second wireless device.

Since the first wireless device may be currently establishing the traffic channel with its base station, the traffic channel may not yet be available to send data. Thus, the first wireless device may respond by sending the SIP OK message over the signaling channel, and it can be sent using short data bursts. As previously described, the SIP OK or other message, may be placed into one or more lower layer packets before ultimately being placed into the short data burst packet for transmission over the signaling channel. Of course, the response message could be sent before the first wireless device starts establishing the traffic channel.

At Step 306, the first wireless device completes establishing the traffic channel with its base station. The first wireless device can complete establishing the traffic channel after it responds to the request, such as the SIP INVITE message, received from the second wireless device. Of course, it is also possible that the first wireless devices completes establishing the traffic channel before it responds to the request from the second wireless device.

At Step 308, the first wireless device communicates with the second wireless device in the session via the traffic channel. For example, the first wireless device and the second wireless device could have established a VoIP session. Using the VoIP session, the first and second wireless devices can exchange packets using the traffic channels established with their respective base station in order to exchange voice traffic. Of course, other types of sessions could also be established, and the first and second wireless devices would similarly send and receive packets in those sessions using their respective traffic channels.

The second device may also use the exemplary process described in FIG. 6. Thus, in an embodiment where the second device is a wireless device, it may use the process described in FIG. 6 to response to a request to establish a session received from the first wireless device. It is also possible, however, that the second wireless device receives the request to establish the session from the first wireless device over the second wireless device's traffic channel with its base station. The traffic channel may be already established prior to receiving the request from the first device, or it may alternatively be established in order to allow the second wireless device to receive the request.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for establishing a VoIP session between a first wireless device and a second wireless device, the method comprising:
    sending a Session Initiation Protocol (SIP) request from the first wireless device to the second wireless device over a first air interface signaling channel to establish a Voice over Internet Protocol (VoIP) session that occurs on a first air interface traffic channel between the first and second wireless devices, wherein the first wireless device communicates with a first wireless network via a first air interface that includes the first air interface signaling channel and the first air interface traffic channel, wherein the first air interface signaling channel is shared by multiple wireless devices and carries communications that are used to establish the first air interface traffic channel, and wherein the first air interface traffic channel is dedicated for single use by the first wireless device and carries voice packets that are part of the VoIP session;
    sending a resource request to a base station controller in the first wireless network over the first air interface signaling channel, thereby beginning a process of establishing the first air interface traffic channel for communicating with the first wireless network;
    receiving a SIP response from the second wireless device over the first air interface signaling channel;
    establishing the VoIP session without the first wireless device first establishing the first air interface traffic channel;
    subsequent to said establishing the VoIP session, establishing the first air interface traffic channel with the first wireless network; and
    the first wireless device communicating a voice packet with the second wireless device via the first air interface traffic channel.

2. A non-transitory computer readable medium having stored therein instructions for causing a central processing unit to execute the method of claim 1.

3. The method of claim 1, wherein the first wireless network is a CDMA network.

4. The method of claim 1, wherein the SIP request is a SIP INVITE message and the SIP response is a SIP OK message.

5. The method of claim 1, wherein the step of sending the SIP request to establish the VoIP session occurs before the step of sending a resource request to a base station controller.

6. The method of claim 1, wherein the step of sending the SIP request to establish the VoIP session occurs after the step sending a resource request to a base station controller.

7. A method for establishing a session between a first wireless device and a second wireless device, wherein the first wireless device communicates with a first wireless network via a first air interface that includes a first air interface signaling channel and a first air interface traffic channel and the second wireless device communicates with a second wireless network via a second air interface that includes a second air interface signaling channel and a second air interface traffic channel, the method comprising:
    sending from the first wireless device to the second wireless device a request to establish a session between the first wireless device and the second wireless device, wherein the request is sent from the first wireless device to the first wireless network over the first air interface signaling channel using short data bursts, and wherein the request is a Session Initiation Protocol (SIP) INVITE message, wherein the SIP request is encapsulated in one or more PPP messages, and wherein the one or more PPP messages are encapsulated in one or more SDB messages, wherein the first air interface signaling channel is shared by multiple wireless devices and carries communications that are used to establish the first air interface traffic channel, and wherein the first air interface traffic channel is dedicated for single use by the first wireless device and data packets that are part of the session; and establishing the session without both the first wireless device and the second wireless device first establishing the first air interface traffic channel or the second air interface traffic channel.

8. The method of claim 7, wherein the request is sent from the second wireless network to the second wireless device.

9. The method of claim 8, wherein the request is sent from the second wireless network to the second wireless device over the second air interface signaling channel using short data bursts.

10. The method of claim 7, further comprising:
the first wireless device receiving from the second wireless device a response to the request, wherein the response is sent from the first wireless network to the first wireless device over the first air interface signaling channel using short data bursts.

11. The method of claim 10, wherein the response is a Session Initiation Protocol (SIP) OK message.

12. The method of claim 10, wherein the response is sent from the second wireless device to the second wireless network.

13. The method of claim 12, wherein the response is sent from the second wireless device to the second wireless network over the second air interface signaling channel using short data bursts.

14. The method of claim 7, wherein the first and second wireless networks are CDMA networks.

15. The method of claim 7, wherein the request is a request to establish a Voice over Internet Protocol (VoIP) session between the first wireless device and the second wireless device.

16. The method of claim 7, wherein the request is a request to establish a push-to-talk session between the first wireless device and the second wireless device.

17. The method of claim 7, further comprising:
establishing the first air interface traffic channel for communicating with the first wireless network; and the first wireless device communicating with the second wireless device via the first air interface traffic channel.

18. The method of claim 17, further comprising:
beginning to establish the first air interface traffic channel before sending the request.

19. The method of claim 17, further comprising:
beginning to establish the first air interface traffic channel after sending the request.

20. A non-transitory computer readable medium having stored therein instructions for causing a central processing unit to execute the method of claim 7.

21. The method of claim 1, wherein the SIP request is encapsulated in one or more PPP messages, and wherein the one or more PPP messages are encapsulated in one or more SDB messages and sent using short data bursts.

22. The method of claim 1, wherein the second wireless device communicates with a second wireless network via a second air interface that includes a second air interface signaling channel and a second air interface traffic channel.

* * * * *